(12) United States Patent
Ott et al.

(10) Patent No.: US 9,989,711 B2
(45) Date of Patent: Jun. 5, 2018

(54) FIBER OPTIC CONNECTOR AND FIBER OPTIC CABLE ASSEMBLY WITH FIBER OPTIC CABLE ANCHORED TO BOOT OF FIBER OPTIC CONNECTOR

(71) Applicant: COMMSCOPE TECHNOLOGIES LLC, Hickory, NC (US)

(72) Inventors: Michael James Ott, Hudson, WI (US); Ponharith Nhep, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days. days.

(21) Appl. No.: 14/775,438

(22) PCT Filed: Mar. 11, 2014

(86) PCT No.: PCT/US2014/023690
§ 371 (c)(1),
(2) Date: Sep. 11, 2015

(87) PCT Pub. No.: WO2014/164880
PCT Pub. Date: Oct. 9, 2014

(65) Prior Publication Data
US 2016/0018605 A1   Jan. 21, 2016

Related U.S. Application Data

(60) Provisional application No. 61/776,427, filed on Mar. 11, 2013, provisional application No. 61/895,082, filed on Oct. 24, 2013.

(51) Int. Cl.
*G02B 6/38* (2006.01)
(52) U.S. Cl.
CPC ......... *G02B 6/3887* (2013.01); *G02B 6/3821* (2013.01); *G02B 6/3823* (2013.01); *G02B 6/3846* (2013.01); *G02B 6/3889* (2013.01)

(58) Field of Classification Search
CPC .............................. G02B 6/38; G02B 6/3889
(Continued)

(56) References Cited

U.S. PATENT DOCUMENTS 4,632,507 A    12/1986  Mignien et al.
5,321,784 A *   6/1994  Cubukciyan ......... G02B 6/3821
                                                         385/78

(Continued)

FOREIGN PATENT DOCUMENTS

JP    2008-116602           5/2008
JP    2008116602 A  *      5/2008
(Continued)

OTHER PUBLICATIONS

International Search Report for International Application No. PCT/US2014/023690 dated Aug. 14, 2014 (2 pages).
(Continued)

*Primary Examiner* — Kaveh C Kianni
(74) *Attorney, Agent, or Firm* — Merchant & Gould P.C.

(57) ABSTRACT

A fiber optic connector and cable assembly is disclosed. The assembly includes a fiber optic connector and a fiber optic cable. The fiber optic cable can be coupled to the assembly at a demarcation section. All components of the fiber optic cable (e.g., fiber, strength members, jacket, etc.) are fixed relative to each other and relative to the fiber optic connector at the demarcation section. The demarcation section may be located on a boot mounted at a proximal end of the fiber optic connector. For example, the demarcation section may be located at a proximal end of the boot.

22 Claims, 19 Drawing Sheets

(58) Field of Classification Search
USPC .......................................................... 385/78
See application file for complete search history.

(56) References Cited

U.S. PATENT DOCUMENTS

| | | | |
|---|---|---|---|
| 5,390,272 A | 2/1995 | Repta et al. | |
| 5,727,101 A * | 3/1998 | Giebel et al. .................. | 385/59 |
| 5,757,101 A * | 5/1998 | Giebel .................. | G02B 6/3834 |
| | | | 385/59 |
| 5,915,056 A | 6/1999 | Bradley et al. | |
| 7,147,385 B2 | 12/2006 | Zimmel et al. | |
| 7,677,812 B2 | 3/2010 | Castagna et al. | |
| 8,684,763 B2 | 4/2014 | Mattson et al. | |
| 8,845,359 B2 | 9/2014 | Taylor et al. | |
| 9,214,759 B2 | 12/2015 | Mattson et al. | |
| 9,413,154 B2 | 8/2016 | Taylor et al. | |
| 2003/0063868 A1* | 4/2003 | Fentress .................. | G02B 6/3825 |
| | | | 385/78 |
| 2004/0135737 A1 | 7/2004 | Finona et al. | |
| 2007/0104445 A1* | 5/2007 | Larson .................. | G02B 6/3801 |
| | | | 385/134 |
| 2008/0253729 A1* | 10/2008 | Gronvall .............. | G02B 6/4472 |
| | | | 385/137 |
| 2008/0310798 A1* | 12/2008 | Cody .................. | G02B 6/3887 |
| | | | 385/80 |
| 2009/0162019 A1 | 6/2009 | Lichoulas et al. | |
| 2009/0196553 A1 | 8/2009 | Anderson et al. | |
| 2009/0238523 A1 | 9/2009 | Honma et al. | |
| 2010/0254663 A1 | 10/2010 | Hopkins et al. | |
| 2011/0002586 A1 | 1/2011 | Nhep | |
| 2011/0044588 A1* | 2/2011 | Larson .................. | G02B 6/3846 |
| | | | 385/81 |
| 2012/0045178 A1 | 2/2012 | Theuerkorn | |
| 2012/0128305 A1* | 5/2012 | Cooke .................. | G02B 6/3887 |
| | | | 385/78 |
| 2012/0257858 A1 | 10/2012 | Nhep | |
| 2012/0288238 A1 | 11/2012 | Park et al. | |
| 2012/0328248 A1* | 12/2012 | Larson .................. | G02B 6/3846 |
| | | | 385/81 |
| 2014/0037250 A1* | 2/2014 | Treadwell ............ | G02B 6/3887 |
| | | | 385/78 |
| 2014/0064665 A1* | 3/2014 | Ott ...................... | G02B 6/3821 |
| | | | 385/60 |
| 2015/0338581 A1* | 11/2015 | Hikosaka ............. | G02B 6/3887 |
| | | | 385/83 |
| 2016/0004016 A1* | 1/2016 | Zimmel .............. | G02B 6/3885 |
| | | | 385/59 |

FOREIGN PATENT DOCUMENTS

| | | |
|---|---|---|
| KR | 101203509 | 11/2012 |
| WO | WO 2009/117060 A1 | 9/2009 |
| WO | WO 2009/148797 A1 | 12/2009 |
| WO | WO 2012/125836 A2 | 9/2012 |

OTHER PUBLICATIONS

International Written Opinion for International Application No. PCT/US2014/023690 dated Aug. 14, 2014 (11 pages).
European Search Report for Application No. 14778839.2 dated Sep. 16, 2016.

* cited by examiner

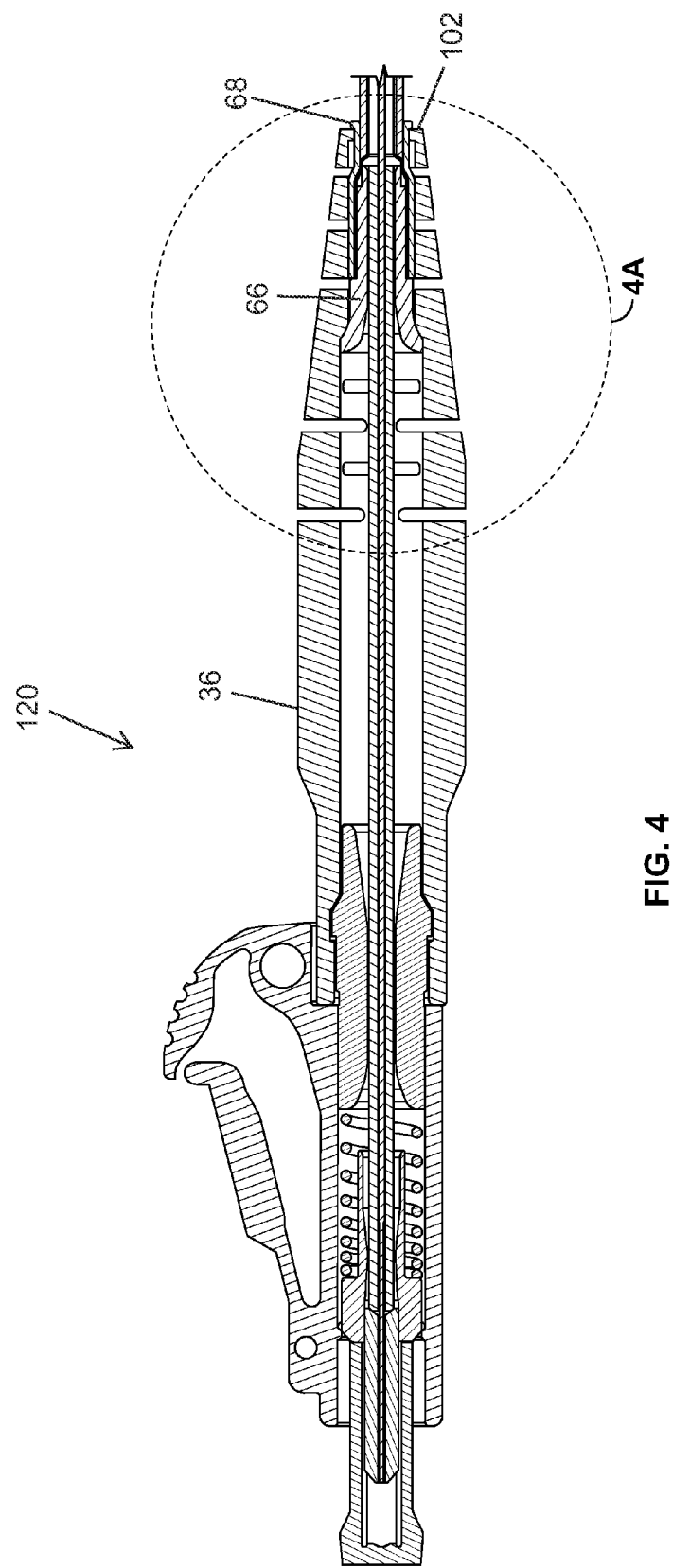

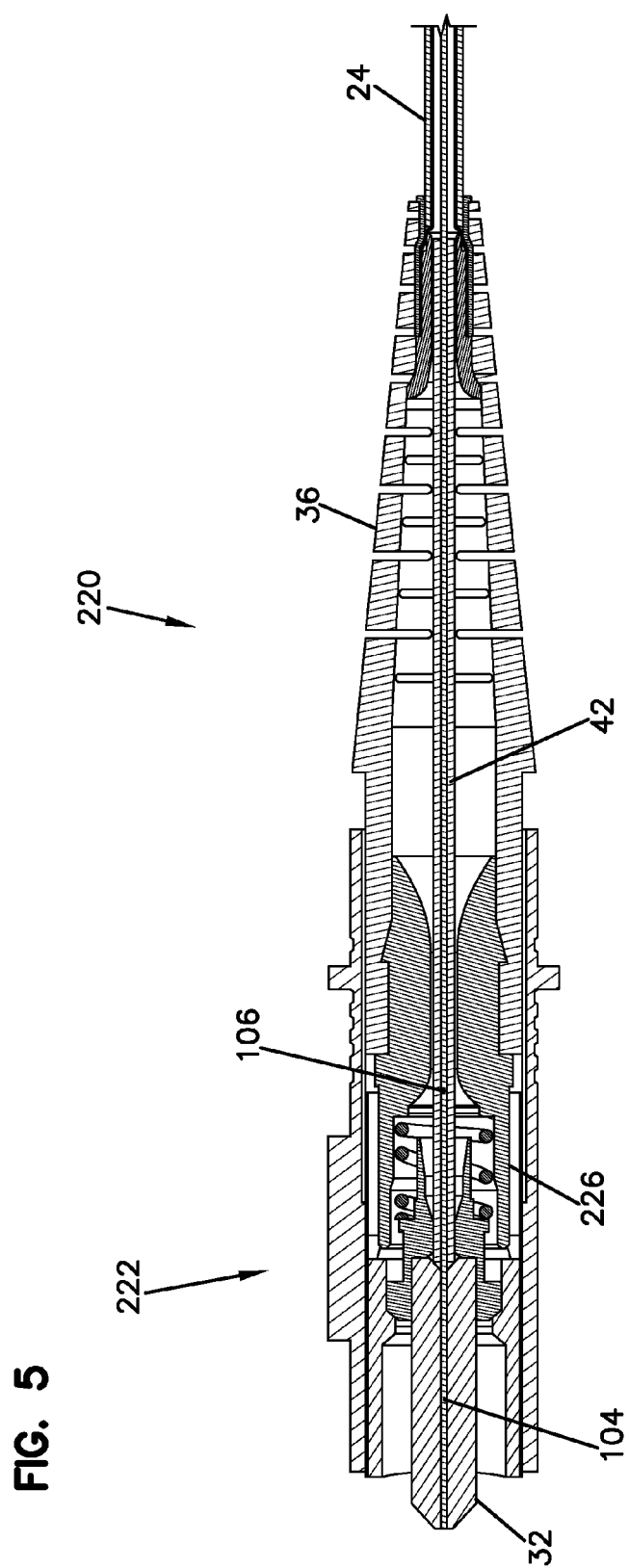

FIBER OPTIC CONNECTOR AND FIBER OPTIC CABLE ASSEMBLY WITH FIBER OPTIC CABLE ANCHORED TO BOOT OF FIBER OPTIC CONNECTOR

CROSS-REFERENCE TO RELATED APPLICATIONS

This application is a National Stage of PCT/US2014/023690, filed on 11 Mar. 2014, which claims the benefit of U.S. Provisional Application Nos. 61/776,427, filed Mar. 11, 2013, and 61/895,082, filed Oct. 24, 2013, both titled "FIBER OPTIC CONNECTOR AND FIBER OPTIC CABLE ASSEMBLY WITH FIBER OPTIC CABLE ANCHORED TO BOOT OF FIBER OPTIC CONNECTOR," the disclosures of which are hereby incorporated herein by reference. To the extent appropriate, a claim of priority is made to each of the above disclosed applications.

TECHNICAL FIELD

The present disclosure relates generally to optical fiber communication systems. More particularly, the present disclosure relates to fiber optic connectors used in optical fiber communication systems.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

Fiber optic connectors often include strain relief boots mounted at proximal ends of the connector housings. Strain relief boots are designed to prevent the optical fibers within the fiber optic cables secured to the fiber optic connectors from bending to radii less than the minimum bend radii of the optical fibers when side loads are applied to the fiber optic cables. Example strain relief boot configurations are disclosed in United States Patent Application Publication Nos. US 2011/0002586 and US 2010/0254663; and are also disclosed in U.S. Pat. Nos. 7,677,812; 7,147,385; 5,915,056; 5,390,272; and 5,261,019.

A fiber optic connector is often secured to the end of a corresponding fiber optic cable by anchoring strength numbers of the cable to the connector housing of the connector. Anchoring is typically accomplished through the use of conventional techniques such as crimps or adhesive. Anchoring the strength numbers of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled in a proximal direction against the bias of the connector spring thereby possibly causing an optical disconnection between the connector and its corresponding mated connector. Fiber optic connectors of the type described above can be referred to as pull-proof connectors.

As indicated above, when two fiber optic connectors are interconnected together, the ferrules of the two connectors contact one another and are respectively forced in proximal directions relative to their housings against the bias of their respective connector springs. In the case of pull-proof connectors, such proximal movement of the ferrules causes the optical fibers secured to the ferrules to move proximally relative to the connector housings and relative to the jackets of the fiber optic cables secured to the connectors. To accommodate this relative proximal movement of the optical fibers, the fiber optic cables typically have sufficient interior space to allow the optical fibers to bend in a manner that does not compromise signal quality in a meaningful way. Typically, the bending comprises "macrobending" in which the bends have radii of curvatures that are larger than the minimum bend radius requirements of the optical fiber.

A number of factors are important with respect to the design of a fiber optic connector. One aspect relates to ease of manufacturing and assembly. Another aspect relates to connector size and the ability to provide enhanced connector/circuit densities. Still another aspect relates to the ability to provide high signal quality connections with minimal signal degradation.

SUMMARY

One aspect of the present disclosure relates to a fiber optic connector and cable assembly in which a reinforcing layer of the fiber optic cable is anchored to a boot of the fiber optic connector. In one example, by anchoring the reinforcing layer to the boot, the boot can effectively be used to provide additional space for accommodating or taking up excess fiber length. In another example, by anchoring the cable reinforcing layer to the connector boot, axial loads are transferred through the boot to the connector body rather than being applied to the optical fiber within the connector body or to any optical splices that may be provided within the connector body.

Another aspect of the present disclosure relates to a fiber optic connector and cable assembly including a fiber optic connector and a fiber optic cable. The fiber optic connector includes a connector body having a distal end portion and a proximal end portion. The fiber optic connector also includes a ferrule positioned at the distal end portion of the connector body and a spring that biases the ferrule in a distal direction relative to the connector body. The fiber optic connector also includes a boot having a distal end portion and a proximal end portion. The boot is more flexible than the connector body. The distal end portion of the boot is coupled to the proximal end portion of the connector body. A reinforcing layer anchor is positioned within a proximal half-portion of the boot. The fiber optic cable includes an optical fiber, an outer jacket that surrounds the optical fiber, and a reinforcing layer positioned between the optical fiber and the outer jacket. The optical fiber passes through the reinforcing layer anchor and the reinforcing layer is secured to the reinforcing layer anchor.

A further aspect of the present disclosure relates to a fiber optic connector and a cable assembly including a fiber optic connector coupled to a fiber optic cable. The fiber optic connector includes a connector body having a distal end portion and a proximal end portion. The fiber optic connector also includes a ferrule positioned at the distal end of the connector body and a spring that biases the ferrule in a distal direction relative to the connector body. The fiber optic connector also includes a boot having a distal end portion and a proximal end portion. The boot is more flexible than the connector body and the distal end portion of the boot is coupled to the proximal end portion of the connector body. The fiber optic cable includes an optical fiber, an outer jacket that surrounds the optical fiber and a tensile reinforcing structure that provides tensile reinforcement to the fiber optic cable. The optical fiber is coupled to the ferrule and the tensile reinforcing structure is anchored relative to the boot at an anchoring location positioned at a proximal half-portion of the boot.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 4 is a longitudinal cross-sectional view of another fiber optic connector and cable assembly in accordance with the principles of the present disclosure;

FIG. 5 is a longitudinal cross-sectional view of still another fiber optic connector and cable assembly in accordance with the principles of the present disclosure;

DETAILED DESCRIPTION

A fiber optic connector is configured to terminate one end of a fiber optic cable. Strength members of the fiber optic cable are anchored to a boot of the fiber optic connector. For example, the strength members can be anchored to the boot at a proximal end of the boot. In certain implementations, the jacket of the fiber optic cable also can be anchored to the boot. In certain implementations, the fiber of the fiber optic cable also can be anchored to the boot. Excess fiber length can be accommodated within the connector and the boot. For example, the boot can define a fiber buckling region and/or the boot and the connector body can cooperate to define a fiber buckling region.

Figure 1:
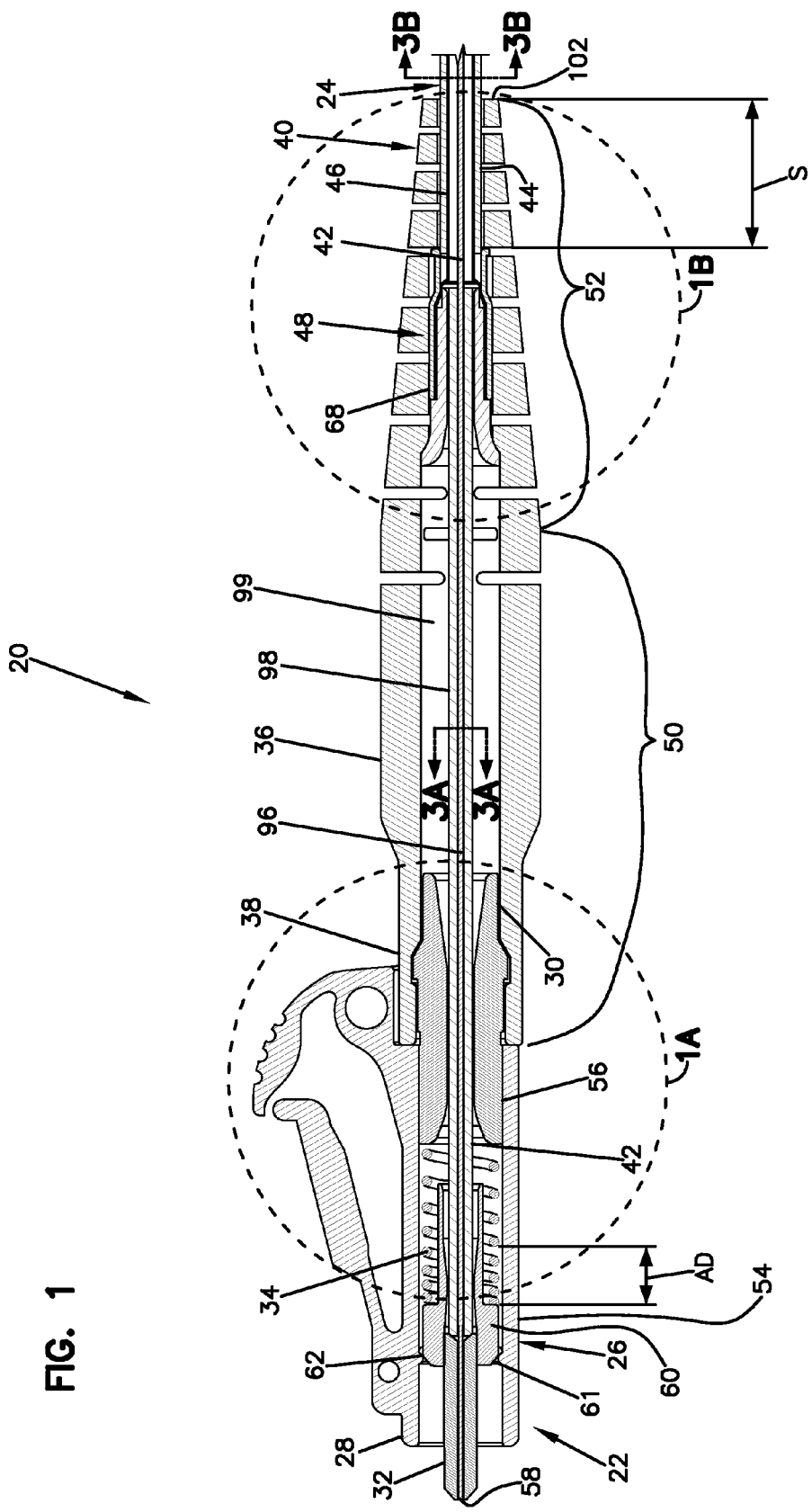
FIG. 1 is a longitudinal cross-sectional view of a fiber optic connector and cable assembly in accordance with the principles of the present disclosure.

FIG. 1 illustrates a fiber optic connector and cable assembly 20 in accordance with the principles of the present disclosure. The fiber optic connector and cable assembly 20 includes a fiber optic connector 22 mounted at the end of a fiber optic cable 24. The fiber optic connector 22 includes a connector body 26 having a distal end portion 28 and a proximal end portion 30. The fiber optic connector 22 also includes a ferrule 32 positioned at the distal end portion 28 of the connector body 26. The fiber optic connector 22 also includes a spring 34 that biases the ferrule 32 in a distal direction relative to the connector body 26. The fiber optic connector 22 further includes a boot 36 having a distal end portion 38 and a proximal end portion 40. The boot 36 is configured to be more flexible than the connector body 26 and to provide the fiber optic cable 24 with bend radius and/or strain relief at the cable-to-connector interface. A distal end portion 38 of the boot 36 is coupled to the proximal end portion 30 of the connector body 26. The fiber optic cable 24 includes an optical fiber 42, an outer jacket 44 that surrounds the optical fiber 42, and a tensile reinforcing structure 46 that provides tensile reinforcement to the fiber optic cable 24. The optical fiber 42 is coupled to the ferrule 32 directly (e.g., the optical fiber 42 extends into and is potted within a central longitudinal opening of the ferrule 32) or indirectly (e.g., the optical fiber 42 is optically spliced to an optical fiber stub that extends through and is potted within the central longitudinal opening of the ferrule 32). The tensile reinforcing structure 46 is anchored relative to the boot 36 at an anchoring location 48. The boot 36 includes a distal half-portion 50 and proximal half-portion 52. As depicted at FIG. 1, the anchoring location 48 is at or within the proximal half-portion 52 of the boot 36.

Referring still to FIG. 1, the connector body 26 of the fiber optic connector 22 includes a main plug portion 54 that forms the distal end portion 28 of the connector body 26 and a rear housing portion 56 that forms the proximal end portion 30 of the connector body 26. In the depicted embodiment, main plug portion 54 defines an interface end of the fiber optic connector 22 at which an end face 58 of the ferrule 32 is accessible for connection to another connector (e.g., through the use of a fiber optic adapter). As depicted, the main plug portion 54 has a form factor and latching configuration consistent with LC-type connectors. A polished end of the optical fiber 42 is located at the end face 58. In the case of a spliced embodiment, the polished end of a stub fiber spliced to the optical fiber 42 can be positioned at the end face 58. The rear housing portion 56 is secured to the proximal end portion 30 and functions as a spring stop for capturing the spring 34 within the main plug portion 54. A distal end of the spring 34 engages a hub 60 mounted to a proximal end of the ferrule 32. A distal end of the hub 60 includes a chamfered portion 61 and the distal bias of the spring 34 causes the chamfered portion 61 of the hub 60 to seat against an annular shoulder 62 within the interior of the main plug portion 54.

As described above, the boot 36 is designed to provide fiber bend radius protection to the fiber optic cable 24 at the cable-to-connector interface. The boot 36 can be made of a polymeric material and has a flexibility greater than the flexibility of the connector body 26. As shown at FIG. 1B, at least the region of the proximal half-portion 52 has a tapered exterior shape 64 that is tapered and segmented to promote flexibility. The tapered exterior shape 64 tapers inwardly as the tapered exterior shape 64 extends in a proximal direction.

The tensile reinforcing structure 46 is configured to provide tensile reinforcement to the fiber optic cable 24. In one example, the tensile reinforcing structure 46 can include a layer of tensile reinforcing material that surrounds the optical fiber 42 and that is positioned between the optical fiber 42 and the outer jacket 44. In one example, the layer of tensile reinforcing material is provided by a reinforcing tape such as an aramid yarn tape. In other examples, the tensile reinforcing structure 46 can include reinforcing fibers, reinforcing strands, reinforcing rods, reinforcing sheets, reinforcing tapes or any other structures suitable for reinforcing the fiber optic cable 24. In certain examples, the tensile reinforcing structure 46 can also provide reinforcement with respect to compressive loads applied to the fiber optic cable 24.

Figure 1A:
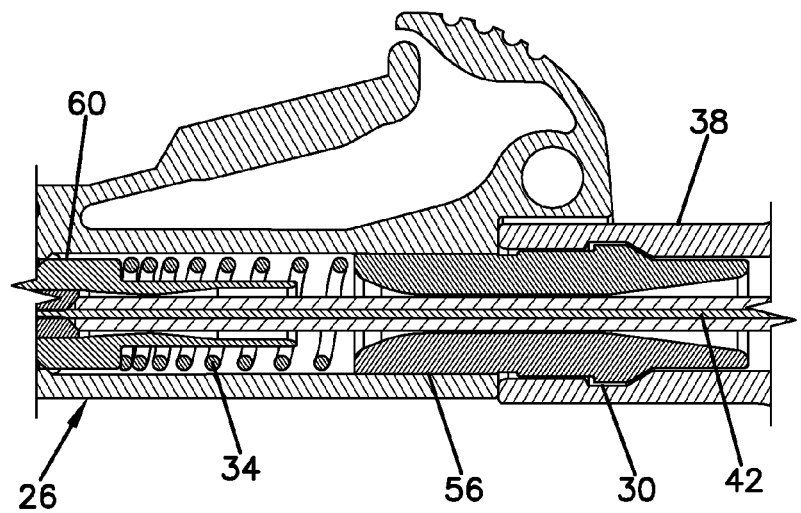
FIG. 1A is an enlarged view of a portion of FIG. 1.
Figure 1B:
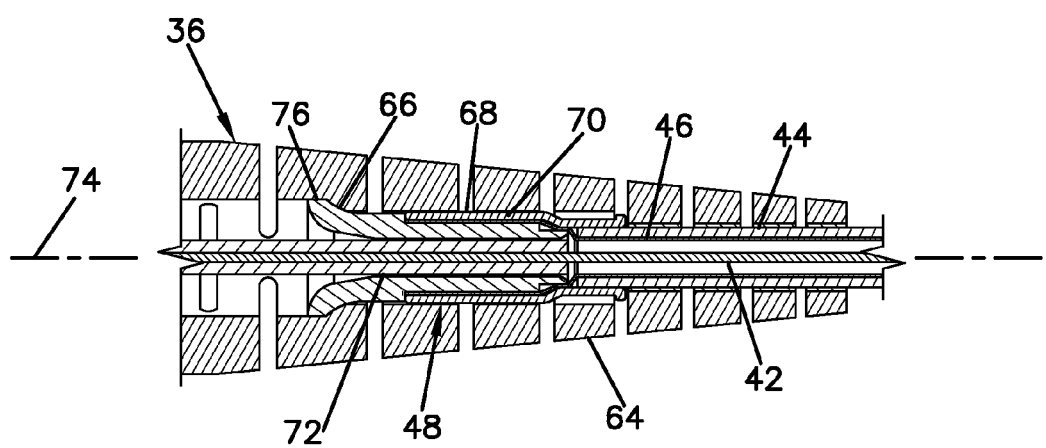
FIG. 1B is an enlarged view of a portion of FIG. 1.
Figure 2:
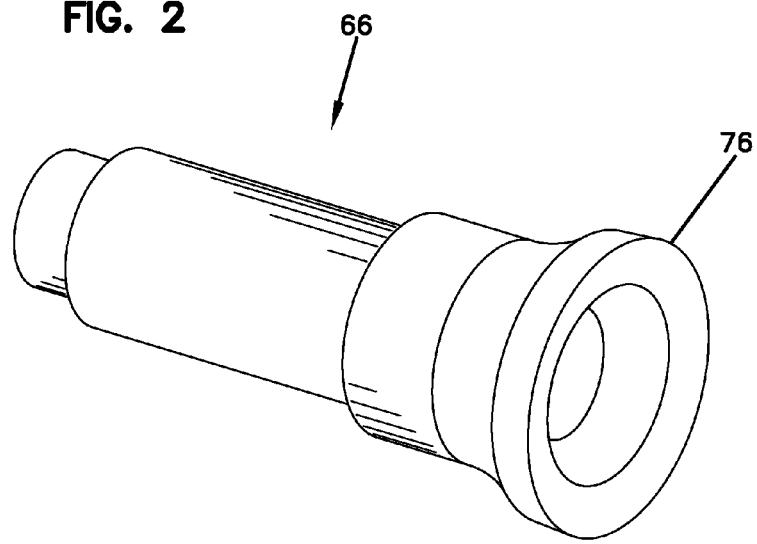
FIG. 2 is a perspective view of a tensile reinforcing structure anchor of the fiber optic connector and cable assembly of FIG. 1.

In the example of FIGS. 1 and 1A, the tensile reinforcing structure 46 is anchored relative to the boot 36 with the assistance of an anchor member 66 (see FIG. 2). The anchor member 66 fits within the interior of the boot 36 and is sized larger than a proximal opening of the boot such that the anchor member 66 cannot be pulled proximally from the interior of the boot 36. The anchor member 66 is secured at the anchoring location 48 within the interior of the boot 36. The tensile reinforcing structure 46 is secured to the anchoring member 66. For example, a crimp band 68 is shown attaching the tensile reinforcing structure 46 to an exterior surface 70 of the anchor member 66. The anchor member 66 defines a through passage 72 that extends through the anchor member 66 from a proximal end to a distal end. The optical fiber 42 extends through the central passage 72. A longitudinal axis 74 is defined through the central passage 72 and the exterior surface 70 extends around the longitudinal axis 74. The anchor member 66 has a flared distal end 76 that flares radially outwardly from the longitudinal axis 74 and that assists in preventing the anchor member 66 from being pulled proximally from the interior of the boot 36. The anchor member 66 can also be referred to as an anchor sleeve, an anchor barrel, an anchor plug, or like terms. In other examples, the tensile reinforcing structure 46 can be adhesively bonded, clamped, tied, wrapped, or otherwise mechanically secured to the anchor member 66. The anchor member 66 is best shown at FIG. 2.

Figure 3A:
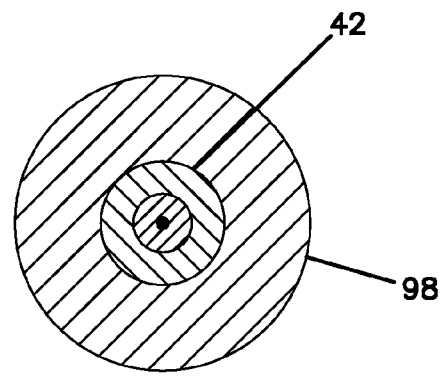
FIG. 3A is a cross-sectional view taken along section line 3A-3A of FIG. 1.
Figure 3B:
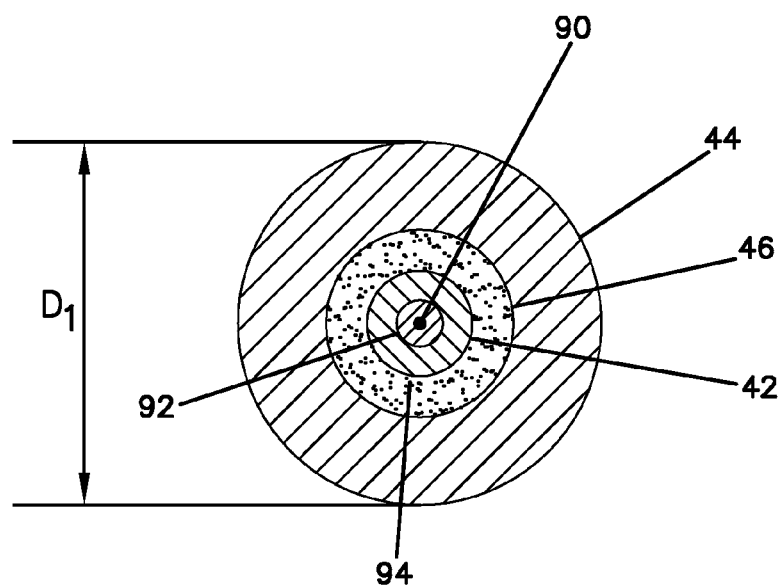
FIG. 3B is a cross-sectional view taken along section line 3B-3B of FIG. 1.

Referring to FIG. 3B, the outer jacket 44 of the fiber optic cable 24 can have a relatively small outer diameter $D_1$. In certain examples, the outer diameter $D_1$ can be less than 2 millimeters, or less than 1.5 millimeters, or less than or equal to about 1.2 millimeters. In certain examples, the optical fiber 24 can includes a core 90, a cladding layer 92 surrounding the core 90 and one or more coating layers 94 surrounding the cladding layer 92. In the embodiment of FIG. 3B, tensile reinforcing structure 46 is depicted as a reinforcing layer formed by aramid yarn (e.g., aramid yarn or aramid yarn tape). In certain examples, no buffer layer or a buffer tube is provided between the coating layer 94 of the optical fiber 42 and the tensile reinforcing structure 46. Thus, in such examples, the tensile reinforcing structure 46 assists in isolating the optical fiber 42 from the outer jacket 44.

Referring to FIGS. 1 and 3A, the optical fiber 42 extends through the connector and is secured within the ferrule 32. A section 96 of the optical fiber 42 that extends from the proximal end of the anchor member 66 to the proximal end of the ferrule 32 is protected within a buffer tube or a furcation tube 98. The furcation tube 98 as well as the optical fiber 42 extend through the central passage 72 of the anchor member 66.

The fiber optic connector 22 is a pull-proof connector in which the tensile reinforcing structure 46 is anchored to the boot 36 which is anchored to the connector body 26. In this way, tensile loads applied to the fiber optic cable 24 are transferred through the boot 36 to the connector body 26. The boot 36 can be connected to the connector body 26 by a mechanical interlock (e.g., a snap-fit connection) or other types of connections (e.g., crimps, adhesive connections, clamps, fasteners, etc.). By anchoring the tensile reinforcing structure 46 to the boot 36 which is anchored to the connector body 26, tensile loads are prevented from being applied to the portion of the optical fiber 42 within the fiber optic connector 22.

Because the fiber optic connector 22 is a pull-proof connector, movement of the ferrule 32 in a proximal direction relative to the connector body 26 causes the optical fiber 42 to be forced/displaced in a proximal direction relative to the connector body 26 and the jacket 44 of the fiber optic cable 24. In the depicted example, the ferrule 32 has a maximum axial displacement AD in the proximal direction during the connection process. The axial displacement AD creates an excess fiber length having a length equal to the length of the axial displacement AD. In certain embodiments, the maximum axial displacement AD can be 0.035 inches.

In the depicted embodiment of FIG. 1, the fiber optic cable 24 has a relatively small outer diameter and a small amount of open space within the interior of the fiber optic cable 24 for allowing the cable 24 to accommodate acceptable macro bending of the optical fiber 42 within the fiber optic cable 24 when the ferrule 32 is forced in the proximal direction relative to the connector body 26 and the cable jacket 44. To prevent unacceptable signal degradation related to micro bending caused by the axial displacement of the optical fiber 42 in the proximal direction, the boot 36 is configured with a take-up region (i.e., also called a buckling region) 99 sized and shaped to take-up the excess fiber length corresponding to the maximum axial displacement AD. Typically, the fiber buckles along a single macro-bend within the take-up region to allow the excess fiber length to be accommodated. In certain examples, the take-up region is at least partially within the boot. In other examples, the take-up/buckling region is entirely within the boot.

Figure 4A:
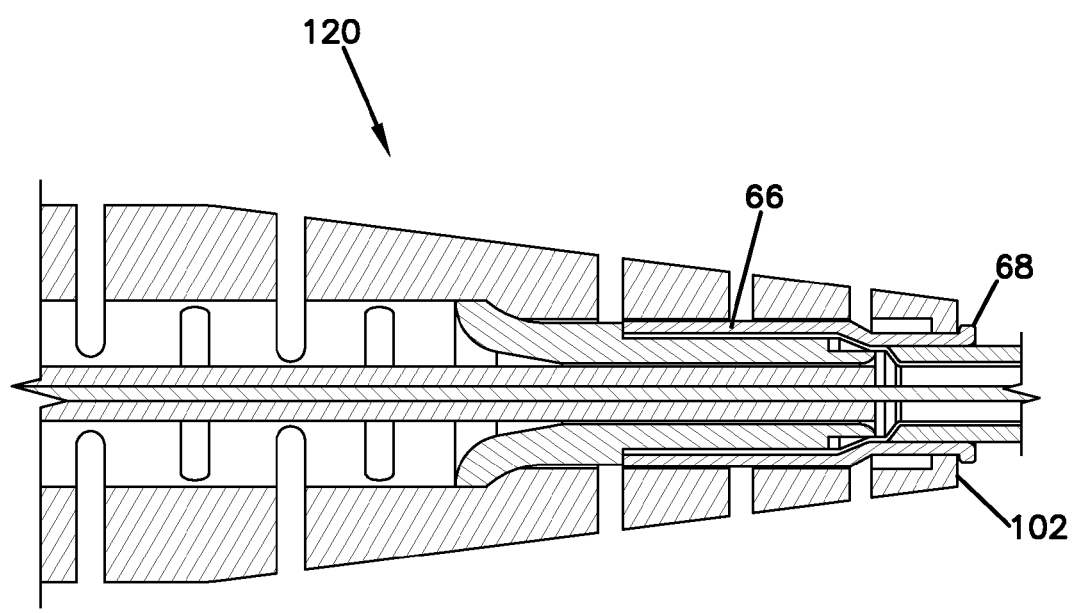
FIG. 4A is an enlarged view of a portion of FIG. 4.
Figure 6:
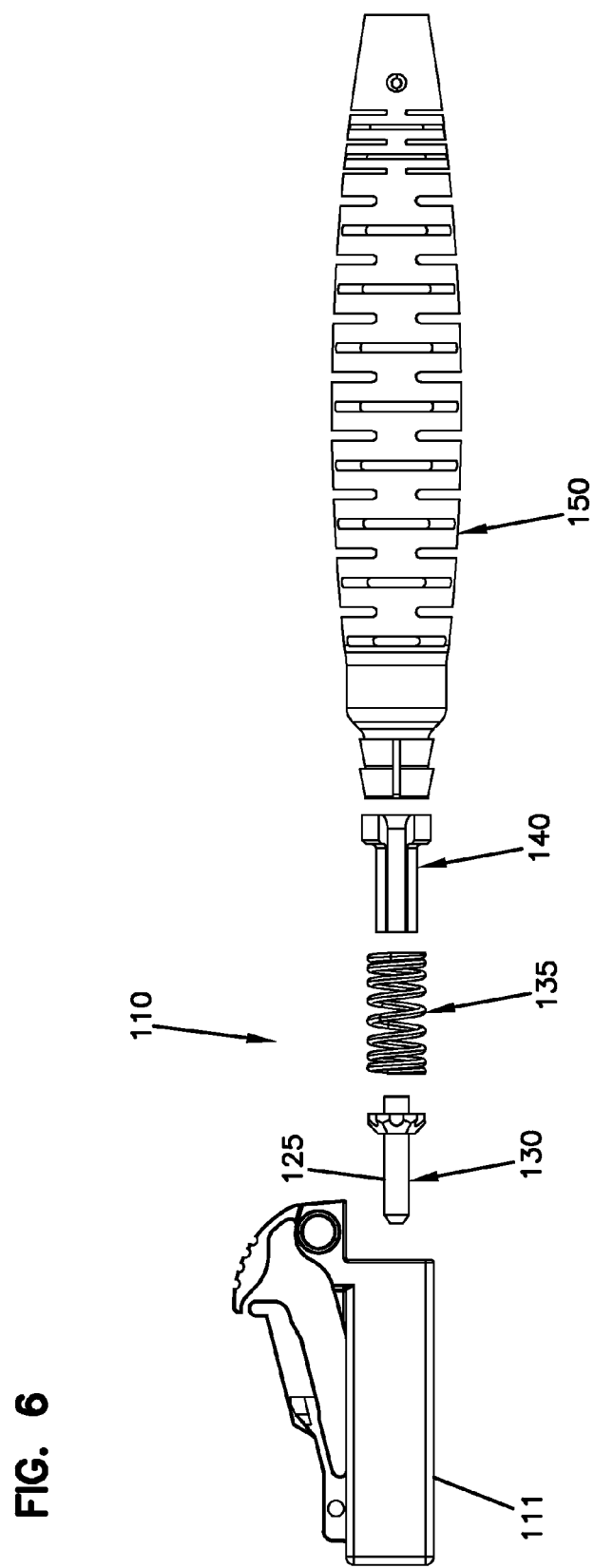
FIG. 6 is an exploded view of another example fiber optic connector and cable assembly including a connector and a boot in accordance with the principles of the present disclosure.

In the example of FIG. 1, the crimp 68 is shown distally offset from the proximal-most end 102 of the boot 36 by a spacing S. In contrast, FIG. 4 shows an alternative fiber optic connector and cable assembly 120 where the crimp 68 is positioned directly at the proximal-most end 102 of the boot 36.

In the examples of FIGS. 1 and 2, the optical fiber 42 extends directly to the ferrule 32. In contrast, FIG. 5 shows an alternative fiber optic connector and cable assembly 220 including a fiber optic connector 222 in which the optical fiber 42 is spliced to an optical fiber stub 104 supported in the ferrule 32. The optical fiber stub 104 and the optical fiber 42 are shown spliced at a splice location 106 within a connector body 226. The connector body 226 has a form factor consistent with an SC-type connector. By effectively anchoring the fiber optic cable 24 to the boot 36 of the fiber optic connector 222, tensile load is prevented from being applied to the splice location 106 thereby protecting the splice location 106 from breakage and/or other damage.

In accordance with some aspects of the disclosure, the fiber optic cable can be coupled to the fiber optic connector at a demarcation section. All components of the fiber optic cable (e.g., fiber, strength members, jacket, etc.) are fixed relative to each other and relative to the fiber optic connector at the demarcation section. In some implementations, the demarcation section is located on a boot mounted at a proximal end of the fiber optic connector. In certain implementations, the demarcation section is located at a proximal end of the boot. In certain implementations, the boot provides fiber bend radius protection to the fiber optic cable.

FIGS. 6-11 illustrate one example fiber optic connector and cable assembly 100 having a demarcation section. The assembly 100 includes a fiber optic connector 110 and a boot 150. The fiber optic connector 110 includes a connector body 111 housing a ferrule hub 130, a spring 135, and a spring press 140. Other example connectors suitable for use in the assembly 100 can otherwise secure the optical fiber at the distal end of the connector. A fiber optic cable 160 can be mounted to the boot 150. In some implementations, an optical fiber 164 extends from the cable 160, through the boot 150, and into the connector 110 (e.g., into a ferrule 125). In other implementations, the optical fiber 164 is spliced (see splice 168 in FIG. 10) to a stub fiber 170 extending proximally from the connector 110 (e.g., from the ferrule 125).

The fiber optic connector 110 is a pull-proof connector in which the tensile reinforcing structure 166 is anchored to the boot 150, which is anchored to the connector body 111. Example tensile reinforcing structures can include reinforcing yarns, reinforcing tapes, and reinforcing rods. In this way, tensile loads applied to the fiber optic cable 160 are transferred through the boot 150 to the connector body 111. The boot 150 can be connected to the connector body 111 by a mechanical interlock (e.g., a snap-fit connection). By anchoring the tensile reinforcing structure 166 to the boot 150, which is anchored to the connector body 111, tensile loads are prevented from being applied to the portion of the optical fiber 164 within the fiber optic connector 110.

Figure 7:
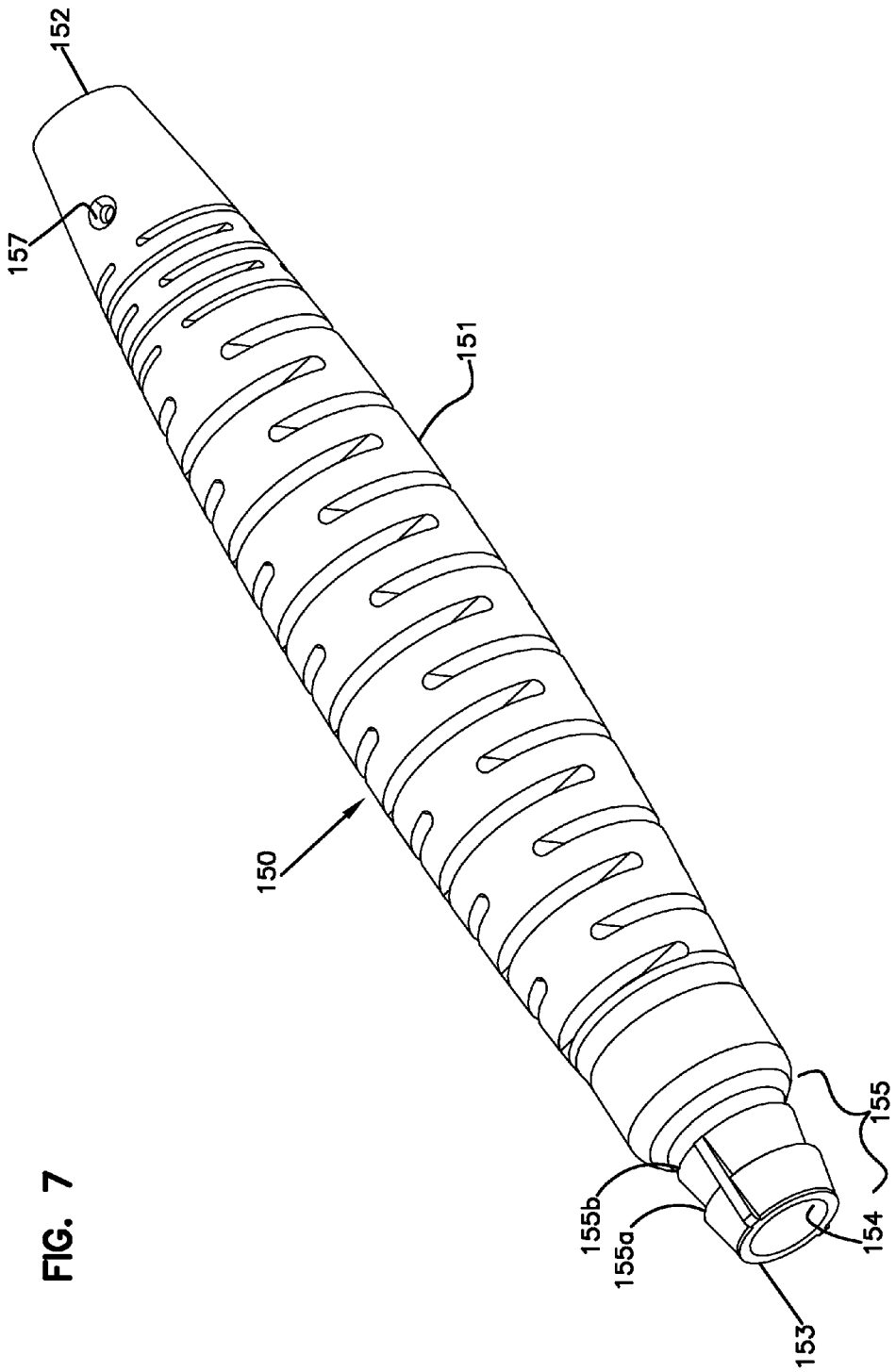
FIG. 7 is a perspective view of the boot of FIG. 6.
Figure 8:
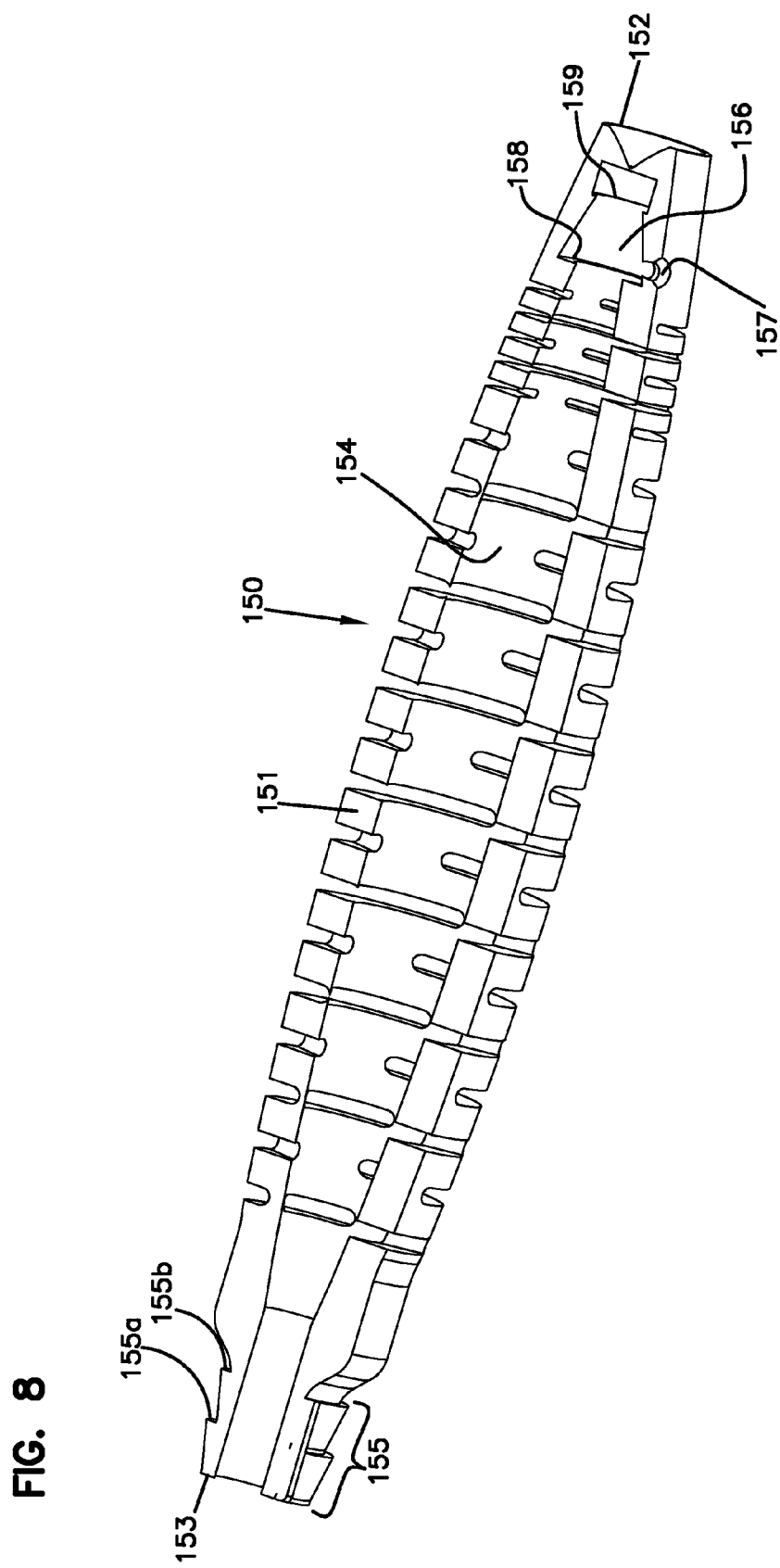
FIG. 8 is a longitudinal cross-section of the boot of FIG. 7.

As shown in FIGS. 7 and 8, the boot 150 includes a body 151 defining an interior fiber channel 154 extending from a proximal end 152 to a distal end 153. At the distal end 153, the body 151 defines a connector attachment region 155 at which the boot 150 is shaped to secure to the connector 110. In some implementations, the connector attachment region 155 is configured to be inserted within the connector body 111. In certain implementations, the connector attachment region 155 is configured to be mechanically interlocked (e.g., snap-fit) with the connector body 111. At the proximal end 152, the boot interior fiber channel 154 defines a cable attachment region 156 at which the fiber optic cable 160 can be fixedly secured to the boot 150. In some implementations, the cable 160 is fixedly secured within the interior fiber channel 154 of the boot body 151.

In some implementations, the connector attachment region 155 includes one or more tapered ridges that are configured to fit within a receiving cavity 115 defined within the connector body 111. The ridges have retaining shoulders that face towards the proximal end 152 of the boot 150 and angled lead-in surfaces positioned distal of the retaining shoulders. In the example shown, the connector attachment region 155 includes a first tapered ridge 155a and a second tapered ridge 155b. In other implementations, the connector attachment region 155 can include a greater or lesser number of ridges. The ridges 155a, 155b are configured to mechanically interlock (e.g., via a snap-fit connection) with an interior structure of the connector body 111.

Figure 9:
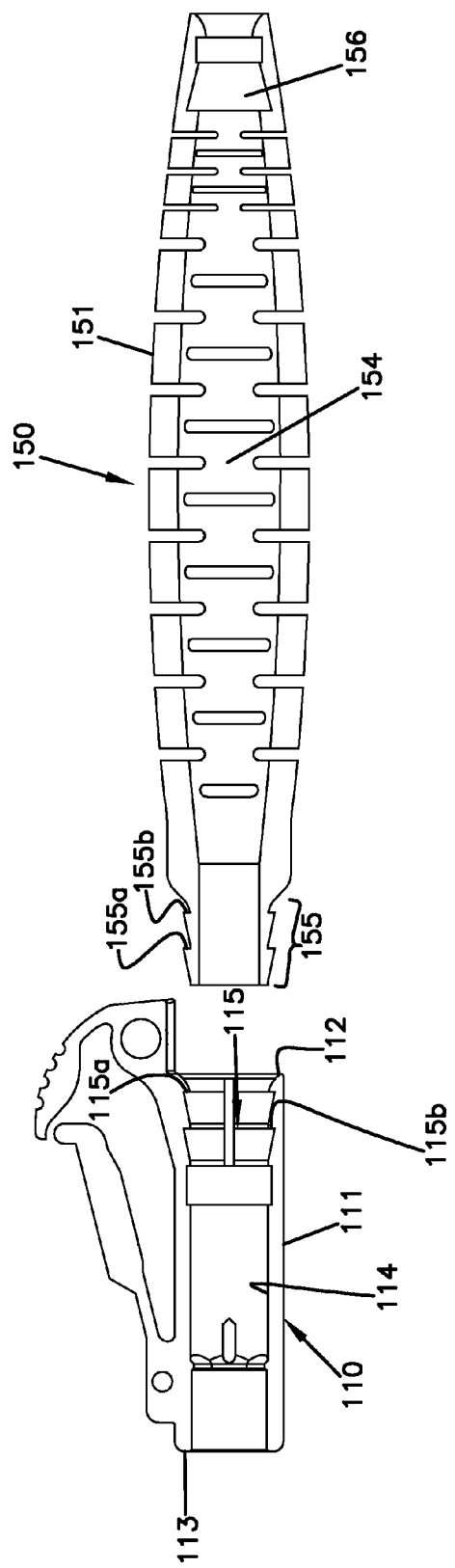
FIG. 9 is a longitudinal cross-section of FIG. 6 with the ferrule hub, a spring, and a spring press removed for ease in viewing.

As shown in FIG. 9, the connector body 111 has a hollow interior 114 and extends from a proximal end 112 to a distal end 113. The proximal end 112 of the connector body 111 defines the receiving cavity 115, which includes a first shoulder 115a and a second shoulder 115b facing towards the distal end 113 of the connector body 111. When the boot 150 is mounted to the connector body 111, the distal end 153 of the boot 150 is slid into the hollow interior 114 of the connector body 111. The connector attachment region 155 of the boot 150 enters the receiving cavity 115 of the connector 110 as will be described in more detail herein. When the boot 150 is fully mounted to the connector 110, the tapered ridges 155a, 155b of the boot body 151 abut the shoulders 115a, 115b of the connector body 111.

Referring back to FIGS. 7 and 8, the cable securement region 156 defines the demarcation section for the connector and cable assembly 100. The fiber optic cable 160 is secured to the boot 150 at the cable securement region 156 so that components of the cable 160 are fixed to the boot 150 at the region 156. In some implementations, adhesive (e.g., a cyanoacrylate) is applied to the region 156 so that any cable components disposed therein are affixed to the boot body 151 at the cable securement region 156. In some implementations, the boot body 151 defines a side opening 157 leading to the cable securement region 156 of the fiber channel 154. The adhesive can be injected or otherwise applied to the cable securement region 156 via the side opening 157. In other implementations, a crimp can be applied over the boot body 151 at this section 156 to tightly crimp the boot and cable 160 to lock all cable components at that section 156.

Figure 10:
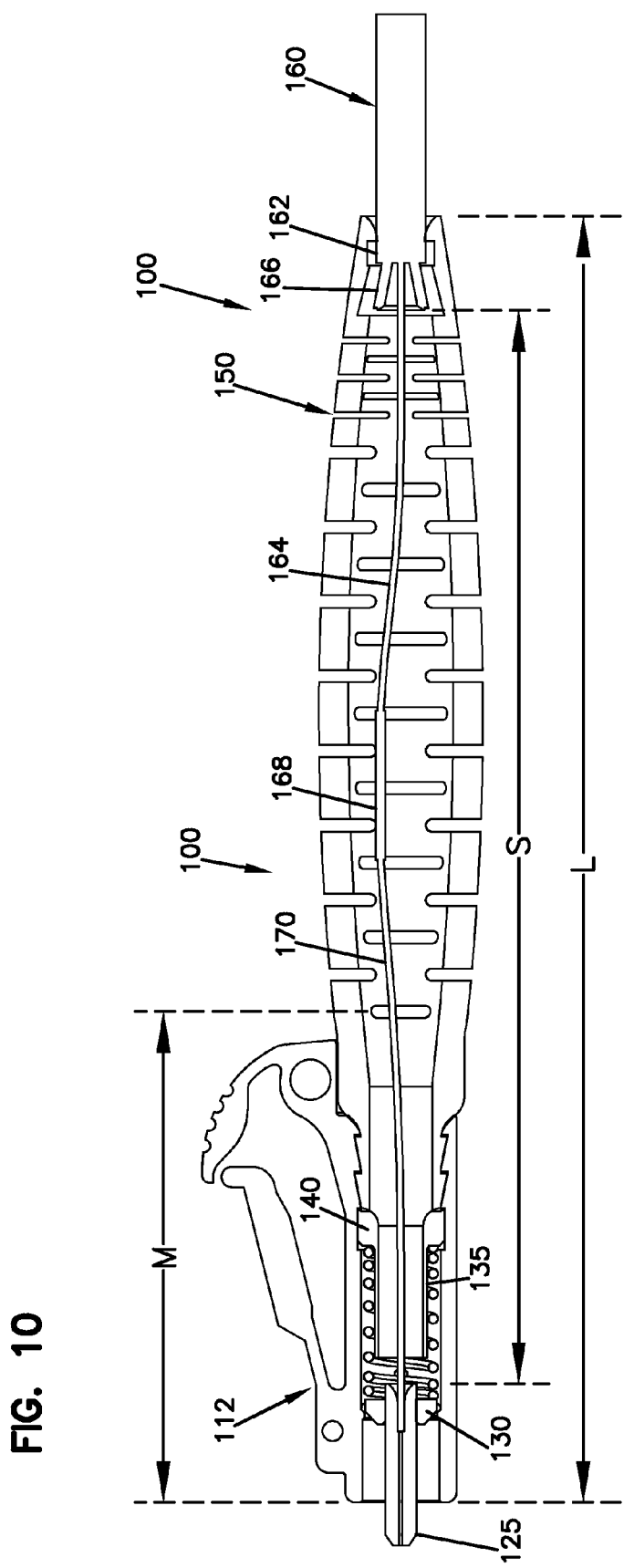
FIG. 10 is a longitudinal cross-section of the fiber optic connector and cable assembly of FIG. 6 after being assembled and mounted to a fiber optic cable.
Figure 11:
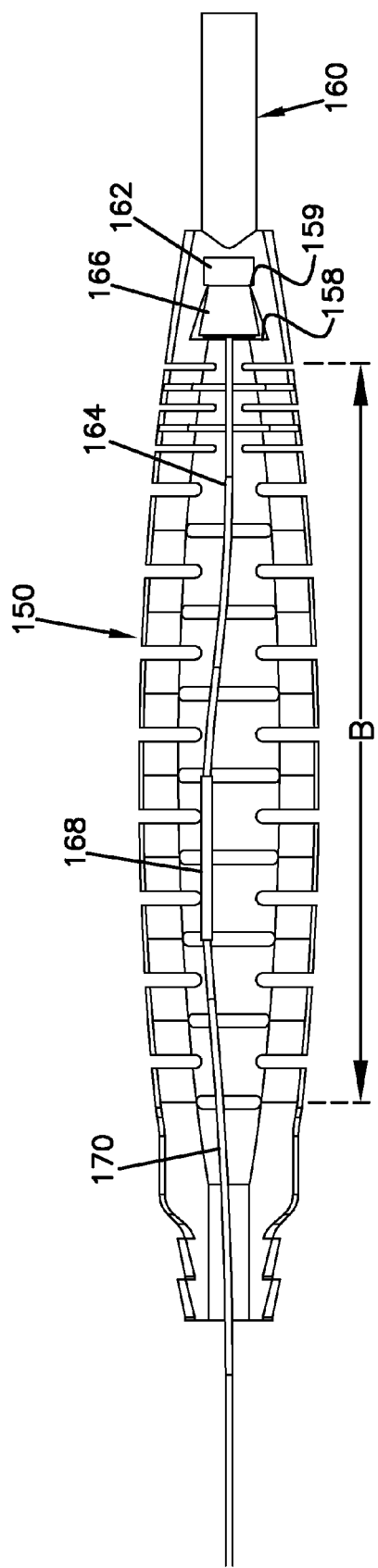
FIG. 11 is an enlarged view of the boot and cable of FIG. 10 with the fiber optic connector removed.

As shown in FIGS. 10 and 11, the cable securement region 156 of the boot 150 is sized to receive at least the strength members 166 of the fiber optic cable 160. In some implementations, the strength members 166 can be disposed within the cable securement region 156 and positioned to abut a proximally facing ridge 158. The strength members 166 are affixed at the ridge 158 when adhesive is applied. In certain implementations, a portion of the cable securement region 156 is sized to receive the jacket 162 of the fiber optic cable 160. The cable securement region 156 can include another proximally-facing ridge 159 that inhibits distal movement of the jacket 162 further into the fiber channel 154. In certain implementations, the jacket 162 is affixed to the ridge 159 when the adhesive is applied.

The fiber optic connector and cable assembly 100 also defines a take-up/buckling region S (FIG. 10) disposed in the connector body 111 and/or the boot body 151. In certain implementations, the take-up/buckling region S is disposed fully within the boot body 151. In other implementations, the boot body 151 and connector body 111 cooperate to define the take-up/buckling region S. In the example shown, the take-up/buckling region S extends along the fiber optic connector and cable assembly 100 from a proximal end of the ferrule 125 (or the point at which the fiber 164, 170 is secured within the connector body 111) to the cable attachment region 156 or demarcation section at the proximal end of the boot 150.

The take-up/buckling region S accommodates a certain amount of slack/buckled fiber. For example, sufficient slack/buckled fiber can be disposed in the take-up/buckling region S to accommodate axial stretching of the boot body 151. The take-up/buckling region S is dimensioned to accommodate excess fiber length resulting from assembly of the assembly 100. The take-up/buckling region S is dimensioned to receive an additional amount of slack/buckled fiber when the fiber optic connector and cable assembly 100 is being connected (e.g., plugged into an adapter). In certain implementations, the take-up/buckling region S can receive the additional amount of fiber to accommodate the axial displacement of the ferrule 125 during a connection.

In some implementations, the take-up/buckling region S is greater than 17 mm. In certain implementations, the take-up/buckling region S ranges from about 17 mm to about 67 mm. In certain implementations, the take-up/buckling region S is about 20 mm to about 60 mm. In certain implementations, the take-up/buckling region S is about 25 mm to about 55 mm. In certain implementations, the take-up/buckling region S is about 30 mm to about 50 mm. In certain implementations, the take-up/buckling region S is about 40 mm to about 45 mm. In an example, the take-up/buckling region S is about 43 mm.

In general, the boot 150 is mounted to the connector 110 in stages. The distal end 153 of the boot 150 is slid into the receiving cavity 115 of the connector body 111 until the first ridge 155a snaps over the first shoulder 115a. The engagement of the first shoulder 115a and first ridge 155a inhibits proximal movement of the boot 150 relative to the connector 110. When the boot 150 is in this first position relative to the connector 110, adhesive is applied to the cable securement region 156 of the boot 150 to secure the cable 160 to the boot 150. After the adhesive is at least partially cured, the boot 150 is further slid distally relative to the connector 110 to a second position. In the second position, the first ridge 155a of the boot 150 abuts the second shoulder 115b of the connector body 111 and the second ridge 155b of the boot 150 abuts the first shoulder 115a of the connector body 111. The shoulders 115a, 115b engage the ridges 155a, 155b to inhibit separation of the boot 150 from the connector 110.

The movement of the boot 150 between the first and second positions during the mounting process creates at least some of the excess fiber length disposed in the take-up/buckling region S. In some implementations, the excess fiber length created by the movement is at least 0.5 mm. In examples, the excess fiber length ranges from about 0.5 mm to about 3 mm. In an example, the excess fiber length created by the movement is about 1.5 mm. As noted above, this excess fiber length protects the fiber 164, 170 if the boot body 151 were to stretch (e.g., due to loads applied by a customer or during testing). For example, loads of up to about ten pounds can be applied to the connector and cable assembly 100 during use. Twenty pound loads can be applied to the assembly 100 during testing. The fiber 164, 170 would straighten out to accommodate stretching of the boot 150.

As shown in FIGS. 10 and 11, components of the fiber optic connector and cable assembly 100 are dimensioned to accommodate the splice 168 (e.g., a fusion splice, a mechanical splice, etc.) and to provide a large take-up/buckling region for managing excess fiber length. In some implementations, the assembly 100 has an overall length L (FIG. 6) ranging from about 40 mm to about 60 mm. In certain implementations, the length L of the boot 150 is about 45 mm to about 55 mm. In an example, the length L of the boot 150 is about 50 mm. In an example, the length L of the boot 150 is about 52 mm. In some implementations, the fiber channel 154 has a sufficient length and cross-dimension to accommodate a splice 168 between the cable fiber 164 and the stub fiber 170 of the ferrule 125. In an example, the splice 168 can be located about 20 mm proximal of the ferrule 125. In other implementations, the splice 168 can be located within the connector body 111.

The boot body 151 includes a preferred bending region B along which the body 151 defines notches, slits, or cut-away portions that facilitate flexing (e.g., laterally and/or axially) of the boot body 151 along the region B (FIG. 11). The fiber optic connector and cable assembly 100 is more flexible along this preferred bending region B than along the connector body 111. In some implementations, the boot body 151 is configured so that the preferred bending region B is greater than 24 mm. In certain implementations, the preferred bending region B ranges from about 25 mm to about 30 mm. In certain implementations, the preferred bending region B is about 27 mm to about 29 mm.

The fiber optic connector and cable assembly 100 has a moment arm M that extends from a distal end 113 of the connector body 111 to the distal end of the bending section B of the boot body 151. The moment arm M is less flexible than the preferred bending region B of the boot body 151. The moment arm M includes the connector body 111 and the distal portion of the boot 150 up to the preferred bending region B. Reducing the length of the moment arm M reduces the strain applied to the cable 160 (e.g., during a side pull on the cable 160). In some implementations, the moment arm M of the fiber optic connector and cable assembly 100 is less than 28 mm. In certain implementations, the moment arm M ranges from about 15 mm to about 25 mm. In certain implementations, the moment arm ranges from about 18 mm to about 22 mm. In an example, the moment arm M is about 19 mm. In another example, the moment arm is about 20 mm.

Figure 12:
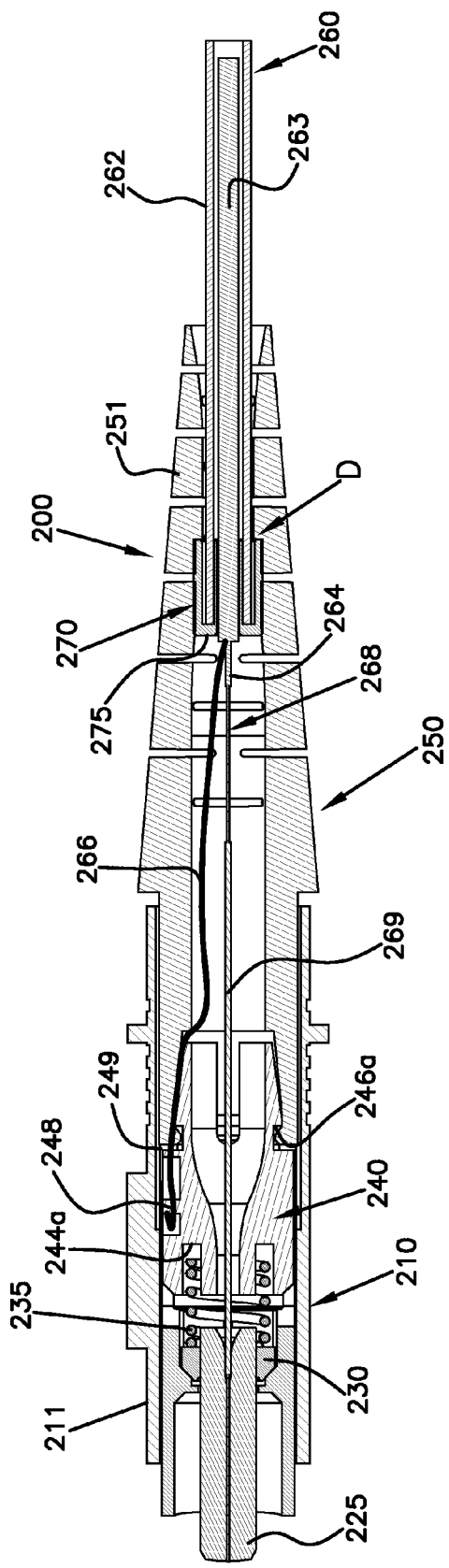
FIG. 12 is an axial cross-sectional view of another example fiber optic connector and cable assembly.
Figure 13:
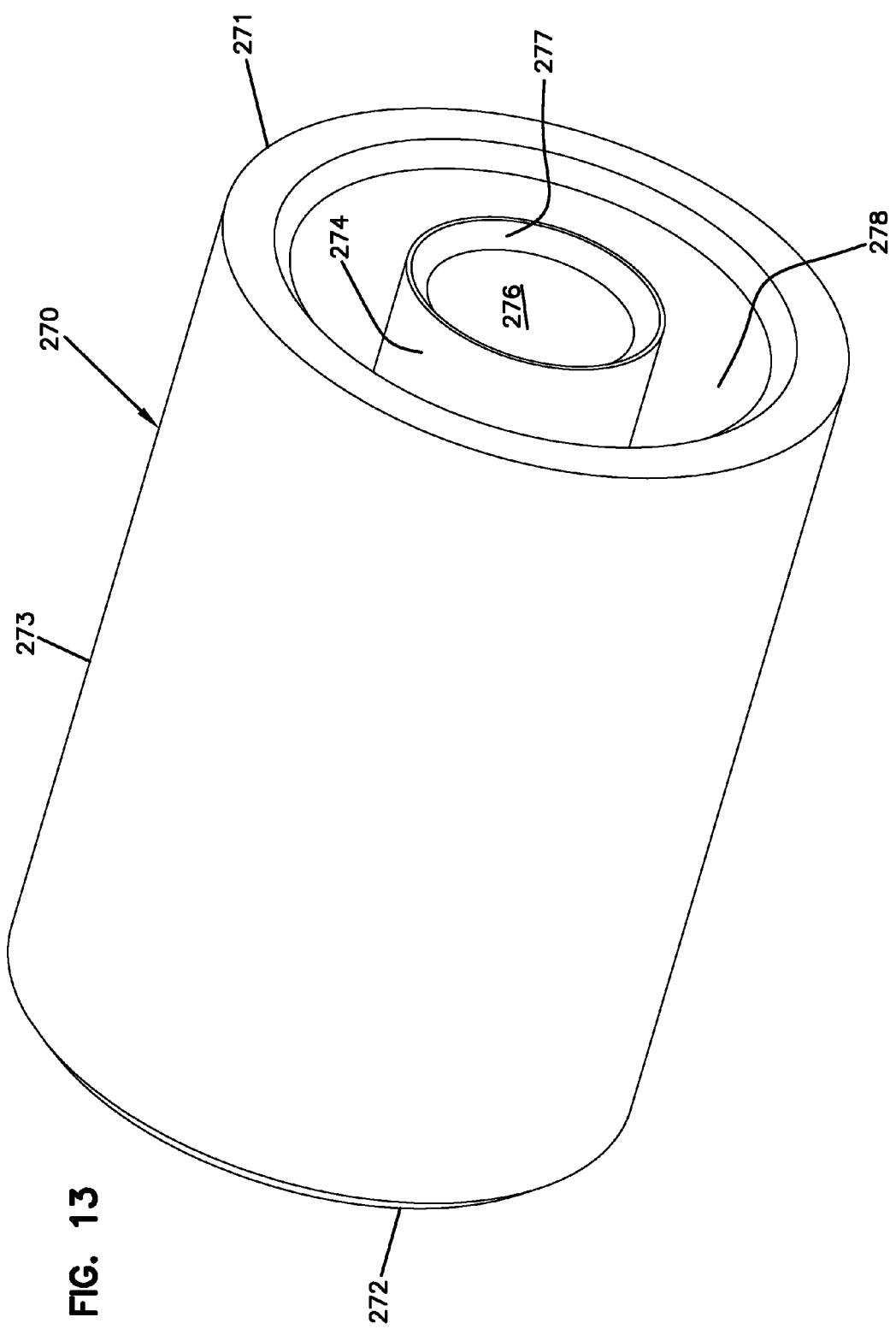
FIG. 13 is a perspective view of an example crimp lock arrangement suitable for use in the fiber optic connector and cable assembly of FIG. 12.
Figure 14:
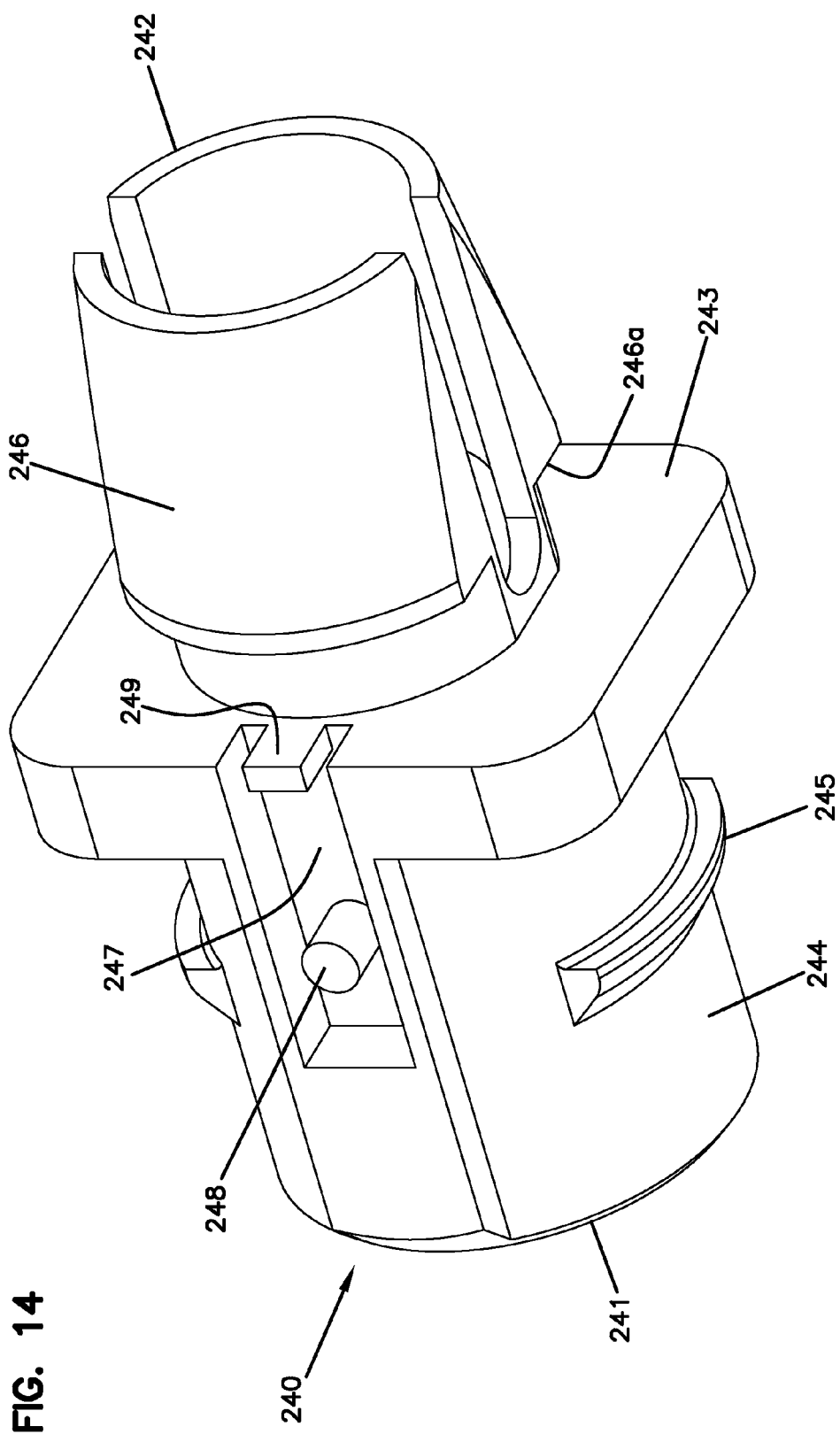
FIG. 14 is a perspective view of an example spring press suitable for use in the fiber optic connector and cable assembly of FIG. 12.

FIGS. 12-14 illustrate another example fiber optic connector and cable assembly 200 having a demarcation section. The assembly 200 includes a fiber optic connector 210 and a boot 250. The fiber optic connector 210 includes a connector body 211 housing a ferrule hub 230, a spring 235, and a spring press 240. A fiber optic cable 260 extends into a rear of the boot 250. A jacket 262 of the cable 260 is axially secured to the boot 250 at a demarcation section D (FIG. 12).

In an example, the demarcation section D is located at a rear half of the boot 250. An optical fiber 264 of the cable 260 extends through the boot 250 towards the connector 210.

In some implementations, the optical fiber 264 extends from the cable 260, through the boot 250, and into the connector 210 (e.g., into a ferrule 225). In other implementations, the optical fiber 264 is spliced at a splice location 268 to a stub fiber 269 extending proximally from the connector 210 (e.g., from the ferrule 225). In certain implementations, the splice location 268 is disposed within the boot 250. In certain implementations, the splice location 268 is disposed within the connector 210. In certain implementations, the splice location 268 is disposed within the spring press 240.

In some implementations, at least a portion of a tensile reinforcing structure (e.g., a layer of aramid yarn) 266 is anchored to the boot 250, which is anchored to the connector body 211. Example tensile reinforcing structures can include reinforcing yarns, reinforcing tapes, and reinforcing rods. In this way, tensile loads applied to the fiber optic cable 260 are transferred through the boot 250 to the connector body 211. The boot 250 can be connected to the connector body 211 by a mechanical interlock (e.g., a snap-fit connection). By anchoring the tensile reinforcing structure 266 to the boot 250, which is anchored to the connector body 211, tensile loads are prevented from being applied to the portion of the optical fiber 264 within the fiber optic connector 210.

In some implementations, the cable 260 can be axially secured to the boot 250 using a crimp lock arrangement. For example, the crimp lock arrangement is crimped over the tensile reinforcing structure to axially secure the cable 260 to the crimp lock arrangement; and the crimp lock arrangement is coupled to the boot 250 to be axially locked relative to the boot (e.g., using adhesive, a mechanical interlock, etc.).

FIG. 13 illustrates one example crimp lock arrangement 270 suitable for use in axially securing the cable 260 to the boot 250. The crimp lock arrangement 270 extends from a first end 271 to a second end 272. The crimp lock arrangement 270 includes an outer annular wall 273 radially spaced from an inner annular wall 274. A rear wall 275 (FIG. 12) connects the outer and inner walls 273, 274. The inner wall 274 defines a passageway 276 extending from the first end 271 to the second end 272. The first end 271 of the inner wall 274 has a tapered region 277 that facilitates routing a cable 260 into the passageway 276 from the first end 271. An annular cavity 278 is defined between the outer and inner walls 273, 274.

As shown in FIG. 12, a portion of the cable 260 can be routed into the passageway 276 from the first end 271 of the crimp lock arrangement 270. For example, the optical fiber 264 is routed through the passageway 276. In examples, a buffer tube 263 around the fiber 264 also extends through the passageway 276 around the fiber 264. In certain examples, the jacket 262 of the cable 260 is routed (e.g., slid) into the cavity 278 defined by the crimp lock arrangement 270. In certain examples, the tensile reinforcing structure 266 is routed into the cavity 278. Applying radial pressure (e.g., a crimping force) to the outer wall 273 of the crimp lock arrangement 270 clamps the jacket 262 and/or tensile reinforcing structure 266 between the outer and inner walls 273, 274. The inner wall 274 inhibits the radial pressure from being applied to the optical fiber 264.

When the cable 260 is being terminated, the boot 250 is routed onto the cable 260 before the crimp lock arrangement 270 is crimped to the cable 260. When the cable 260 has been axially secured to the crimp lock arrangement 270, the boot 250 is slid over the crimp lock arrangement 270 until the crimp lock arrangement 270 abuts an inner shoulder (e.g., shoulder 258 shown in FIG. 15). The boot 250 is axially secured to the connector 210 (e.g., as described below).

In certain implementations, at least a portion of the tensile reinforcing structure 266 can be coupled directly to the connector 210. For example, in FIG. 12, one or more strands of aramid yarn (or other tensile reinforcing structure) 266 are shown routed from the terminated end of the cable jacket 262 to the spring press 240. Accordingly, the spring press 240 can support at least some of the axial load applied to the cable 260. In some examples, all of the tensile reinforcing structure 266 extends through the boot 250 and connects to the spring press 240 and thereby axially secures to the connector 210. In other examples, all of the tensile reinforcing structure 266 connects to the crimp lock arrangement and thereby axially secures to the boot 250.

FIG. 14 illustrates one example spring press 240 suitable for use in a connector 210 for supporting at least part of the axial load of a cable 260. The spring press 240 defines a passage that extends from a first end 241 to a second end 242. An optical fiber (e.g., optical fiber 264 of cable 260 or optical stub fiber 269) extends through the passage to the optical ferrule 225 (see FIG. 12). The spring press 240 has a first section 244 that supports the spring 235; and a second section 246 that couples to the boot 250. For example, the first section 244 defines an inner cavity 244a (FIG. 12) that receives one end of the spring 235. The second section 246 defines a shoulder 246a to which the boot 250 attaches as will be described in more detail below.

An outwardly extending flange 243 is disposed between the first and second sections 244, 246. The flange 243 aids in axially and/or rotationally securing the spring press 240 to the connector body 211. In certain implementations, the first section 244 includes one or more radially extending ribs 245 that aid in axially and/or rotationally securing the spring press 240 to the connector body 211. For example, the ribs 245 may engage internal shoulders defined by the connector body 211.

In the example shown, the second section 246 of the spring press 240 defines two axially extending slots that separate the second section 246 into two members. In other examples, the second section 246 can include two members extending rearwardly from the flange 243. The two members can be flexed to move distal ends of the two members towards each other. For example, the members can deflect inwardly when the boot 250 is mounted over the members. Each member defines one of the shoulders 246a. A latching surface (e.g., surface 255 in FIG. 15) engages the shoulders 246a.

The spring press 240 defines a tensile reinforcing structure attachment section 247. For example, the spring press 240 may define a recessed surface to accommodate winding of the tensile reinforcement structure (see FIG. 12). In certain examples, the spring press 240 includes a pem 248 about which the tensile reinforcing structure can be wound. In certain examples, the spring press 240 also can include a flange 249 axially spaced from the pem 248. In such examples, the tensile reinforcing structure can be wound around both the pem 248 and the flange 249.

Figure 15:
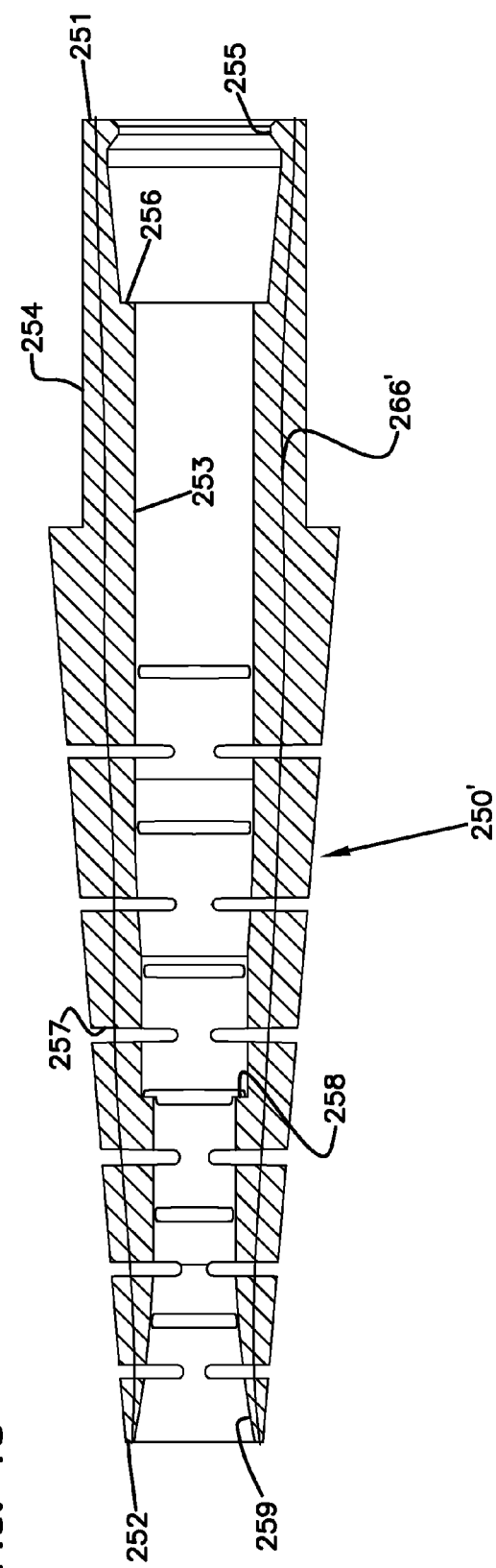
FIG. 15 is an axial cross-sectional view of an example boot suitable for use in the fiber optic connector and cable assembly of FIG. 12.

FIG. 15 illustrates an example boot 250' that is substantially similar to the boot 250 except the boot 250' includes an embedded tensile reinforcing structure 266'. The boot 250' defines a passageway 253 extending from a first end 251 to a second end 252. The boot 250' defines an attachment region 254 at the first end 251 and a strain-relief region 257 at the second end 252. A tensile reinforcing structure 266' (e.g., aramid yarns, reinforcing tape, reinforcing rods) extends through a body of the boot 250' from the first end 251 to the second end 252.

The attachment region 254 of the boot 250' includes a latching surface 255 that protrudes radially into the passageway 253 at the first end 251. An internal shoulder 256 is axially spaced from the latching surface 255 and faces towards the latching surface 255. The attachment region 254 of the boot 250' is installed over the second section 246 of the spring press 240 by sliding the two members of the second section 246 into the passageway 253 from the first end 251. The members are slid into the passageway 253 until the latching surface 255 snaps over the shoulders 246a of the spring press 240 to inhibit removal of the spring press 240 from the boot 250'. In certain examples, distal ends of the two spring press members face the internal shoulder 256 of the boot 250'. The internal shoulder 256 inhibits continued insertion of the spring press 240 into the boot 250'.

The strain-relief section 257 defines notches, slits, or other areas of discontinuous material to promote flexibility along a length of the strain-relief section 257. The passageway 253 defines an internal shoulder 258 within the strain-relief section 257. The internal shoulder 258 axially supports a crimp lock arrangement (e.g., crimp lock arrangement 270 in FIG. 12) or other anchor member to which the cable 260 is coupled. For example, the internal shoulder 258 inhibits the crimp lock arrangement or other anchor member from being axially pulled through the second end 252 of the boot 250'. In some implementations, the boot 250' is sufficiently long to accommodate a take-up/buckled region of the fiber 264. For example, the take-up/buckled region of the fiber 264 may be provided to accommodate boot stretching.

Figure 16:
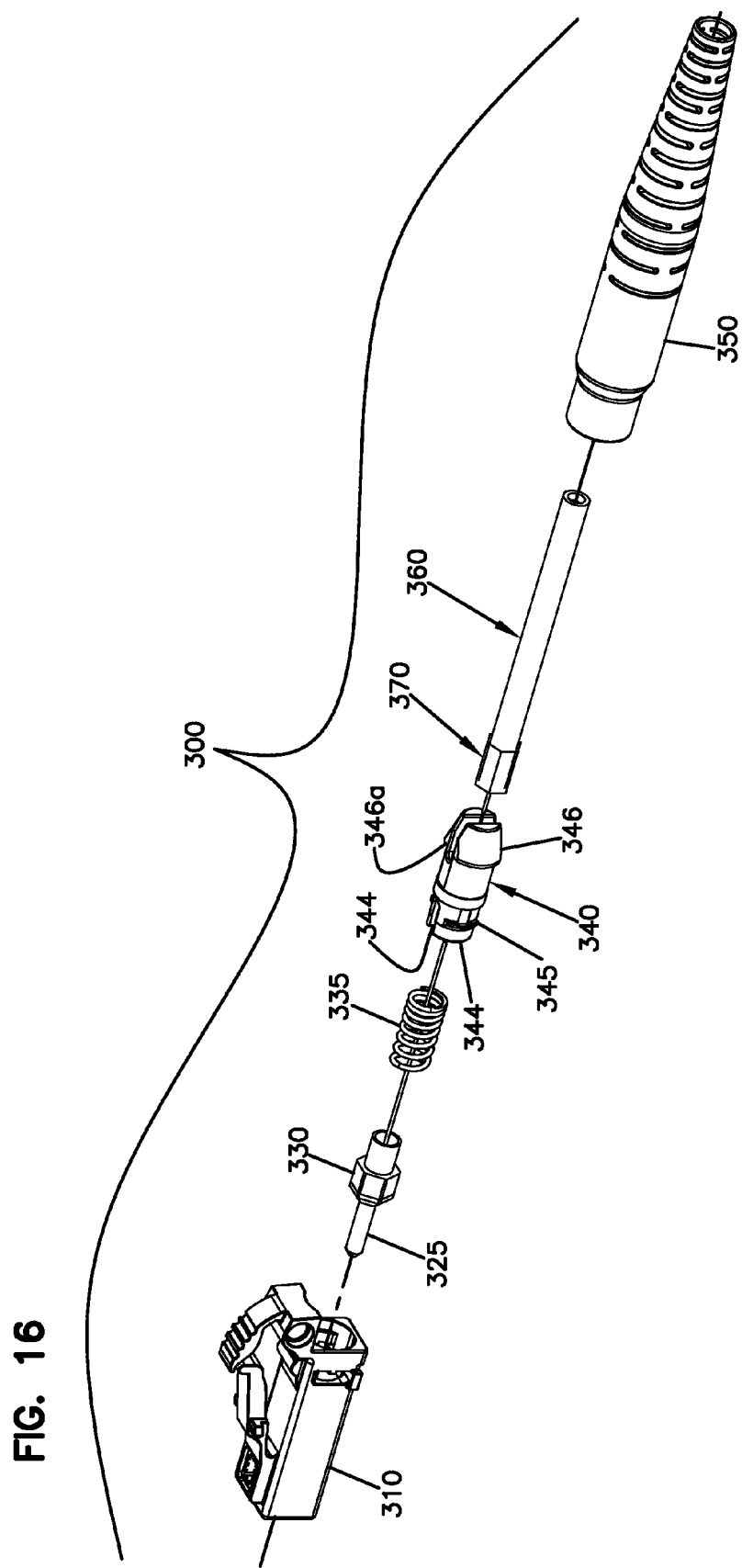
FIG. 16 is a perspective view of another example fiber optic connector and cable assembly with components thereof axially exploded for ease in viewing.
Figure 17:
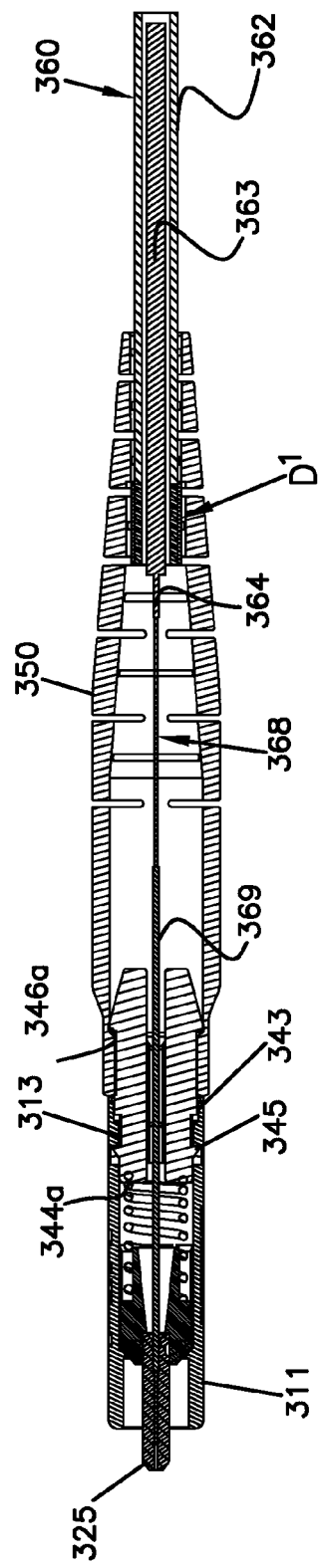
FIG. 17 is an axial cross-sectional view of the assembled fiber optic connector and cable assembly of FIG. 16.

FIGS. 16-17 illustrate another example fiber optic connector and cable assembly 300 having a demarcation section. The assembly 300 includes a fiber optic connector 310 and a boot 350. The fiber optic connector 310 includes a connector body 311 housing a ferrule hub 330, a spring 335, and a spring press 340. A fiber optic cable 360 extends into a rear of the boot 350. A jacket 362 of the cable 360 is axially secured to the boot 350 at a demarcation section D' (FIG. 17). In an example, the demarcation section D' is located at a rear half of the boot 350. An optical fiber 364 of the cable 360 extends through the boot 350 towards the connector 310.

In some implementations, the optical fiber 364 extends from the cable 360, through the boot 350, and into the connector 310 (e.g., into a ferrule 325). In other implementations, the optical fiber 364 is spliced at a splice location 368 to a stub fiber 369 extending proximally from the connector 310 (e.g., from the ferrule 325). In certain implementations, the splice location 368 is disposed within the boot 350. In certain implementations, the splice location 368 is disposed within the connector 310. In certain implementations, the splice location 368 is disposed within the spring press 340.

In some implementations, the cable 360 can be axially secured to the boot 350 using an anchor member 370. For example, the anchor member 370 can be crimped or otherwise connected to a tensile reinforcing structure 366 of the cable 360 to axially secure the cable 360 to the anchor member 370; and the anchor member 370 is coupled to the boot 350 to be axially locked relative to the boot 350 (e.g., using adhesive, a mechanical interlock, etc.). In other implementations, at least a portion of the tensile reinforcing structure 366 can be coupled directly to the connector 310. For example, one or more strands of aramid yarn (or other tensile reinforcing structure) 366 can be routed from the terminated end of the cable jacket 362 to the spring press 340. Accordingly, the spring press 340 can support at least some of the axial load applied to the cable 360. In some examples, all of the tensile reinforcing structure 366 extends through the boot 350 and connects to the spring press 340 and thereby axially secures to the connector 310. In other examples, all of the tensile reinforcing structure 366 connects to the crimp lock arrangement and thereby axially secures to the boot 350.

One example spring press 340 has a first section 344 that supports the spring 335; and a second section 346 that couples to the boot 350. For example, the first section 344 defines an inner cavity 344a (FIG. 17) that receives one end of the spring 335. The second section 346 defines a shoulder 346a to which the boot 350 attaches. In the example shown, the second section 346 of the spring press 340 defines includes two members that can be flexed towards each other. For example, the members can deflect inwardly when the boot 350 is mounted over the members. Each member defines one of the shoulders 346a. A latching surface of the boot 350 engages the shoulders 346a.

A radial shoulder 343 and one or more radial ribs 345 aid in axially securing the spring press 340 to the connector body 311. For example, an inward protrusion 313 of the connector body 311 may be disposed between the radial shoulder 343 and a radial rib 345 (see FIG. 17). In certain implementations, portions of the spring press 340 may be flat or the transverse cross-section of the spring press 340 may be unsymmetrical to inhibit rotation of the spring press 340 relative to the connector body 311.

In some implementations, the spring press 340 defines a tensile reinforcing structure attachment section. For example, the spring press 340 may define a recessed surface to accommodate winding of the tensile reinforcement structure. In certain examples, the spring press 340 includes a pem about which the tensile reinforcing structure can be wound. In certain examples, the spring press 340 also can include a flange axially spaced from the pem. In such examples, the tensile reinforcing structure can be wound around both the pem and the flange. In still other implementations, the boot 350 can include an embedded tensile reinforcing structure. In some implementations, the boot 350 is sufficiently long to accommodate a take-up/buckled region of the fiber 364. For example, the take-up/buckled region of the fiber 364 may be provided to accommodate boot stretching.

The specification, examples and drawing included herewith disclose examples of how inventive aspects of the disclosure may be embodied. It will be appreciated that changes may be made in the specifics of the disclosed examples without departing from the spirit and scope of the broad inventive aspects of the disclosure.

What is claimed is:

1. A fiber optic connector and cable assembly comprising:
a fiber optic connector including a connector body and a boot, the boot being segmented so that the boot is more flexible than the connector body, and the boot extending between a proximal-most end and a distal-most end, the boot having a proximal half and a distal half, the distal half extending from the distal-most end to a central location of the boot, the proximal half of the boot extending from the central location of the boot to the proximal-most end, the boot having a distal end portion that is coupled to a proximal end portion of the connector body;

a fiber optic cable including an optical fiber, an outer jacket that surrounds the optical fiber, and a tensile reinforcing structure that provides tensile reinforcement to the fiber optic cable, the optical fiber extending through the boot towards the connector body, and the tensile reinforcing structure being anchored relative to the boot at an anchoring location positioned at the proximal half of the boot; and an anchoring member defining the anchoring location, the anchoring member being fully disposed within the proximal half of the boot.

2. The fiber optic connector and cable assembly of claim 1, further comprising a crimp band for securing the tensile reinforcing structure to a reinforcing layer anchor installed within the boot.

3. The fiber optic connector and cable assembly of claim 2, wherein the crimp band is distally offset from the proximal-most end of the boot.

4. The fiber optic connector and cable assembly of claim 2, wherein the crimp band is positioned at the proximal-most end of the boot.

5. The fiber optic connector and cable assembly of claim 1, wherein the anchoring member defines an inner passage through which the optical fiber extends, and wherein the tensile reinforcing structure is crimped to the anchoring member.

6. The fiber optic connector and cable assembly of claim 5, wherein the tensile reinforcing structure is crimped to the anchoring member with a crimp band.

7. The fiber optic connector and cable assembly of claim 5, wherein the anchoring member includes an outer wall and an inner wall, wherein the tensile reinforcing structure is crimped between the outer and inner walls.

8. The fiber optic connector and cable assembly of claim 1, wherein the tensile reinforcing structure is adhesively anchored to the boot.

9. The fiber optic connector and cable assembly of claim 8, wherein the optical fiber and the outer jacket also are adhesively anchored to the boot.

10. The fiber optic connector and cable assembly of claim 1, wherein the anchoring location defines a demarcation point at which the tensile reinforcing structure, the optical fiber, and the outer jacket are fixed relative to the boot.

11. The fiber optic connector and cable assembly of claim 10, wherein the tensile reinforcing structure is anchored to the proximal-most end of the boot.

12. The fiber optic connector and cable assembly of claim 1, wherein the distal end portion of the boot fits into the proximal end portion of the connector body.

13. The fiber optic connector and cable assembly of claim 1, wherein the distal end portion of the boot fits over the proximal end portion of the connector body.

14. The fiber optic connector and cable assembly of claim 1, wherein the boot defines a fiber channel configured to accommodate excess fiber length when a distal end of the optical fiber is moved relative to the connector body.

15. The fiber optic connector and cable assembly of claim 1, wherein a moment arm of the fiber optic connector is no more than about 25 mm.

16. The fiber optic connector and cable assembly of claim 1, wherein the optical fiber extends through the connector body so that a distal end of the optical fiber is accessible at a distal end portion of the connector body.

17. The fiber optic connector and cable assembly of claim 1, wherein a stub optical fiber is spliced to the optical fiber of the fiber optic cable at an optical splice, wherein a distal end of the stub optical fiber is accessible at a distal end portion of the connector body.

18. The fiber optic connector and cable assembly of claim 17, wherein the optical splice is located within a fiber take-up region of the boot.

19. The fiber optic connector and cable assembly of claim 1, further comprising a ferrule positioned at a distal end portion of the connector body and a spring that biases the ferrule in a distal direction relative to the connector body, wherein the optical fiber is coupled to the ferrule.

20. The fiber optic connector and cable assembly of claim 1, wherein the connector body is an LC connector body.

21. The fiber optic connector and cable assembly of claim 1, wherein the connector body is an SC connector body.

22. A fiber optic connector and cable assembly comprising:

a fiber optic connector including a connector body and a boot, the boot being segmented so that the boot is more flexible than the connector body, and the boot having a distal end portion that is coupled to a proximal end portion of the connector body;

a fiber optic cable including an optical fiber, an outer jacket that surrounds the optical fiber, and a tensile reinforcing structure that provides tensile reinforcement to the fiber optic cable, the optical fiber extending through the boot towards the connector body, and the tensile reinforcing structure being anchored relative to the boot at an anchoring location positioned at a proximal half-portion of the boot; and an anchoring member disposed within an interior of the boot, the anchoring member defining an inner passage through which the optical fiber extends, wherein the tensile reinforcing structure is crimped to the anchoring member;

wherein the anchoring member includes an outer wall and an inner wall, wherein the tensile reinforcing structure is crimped between the outer and inner walls.

* * * * *